United States Patent
Ren et al.

(10) Patent No.: US 10,556,814 B2
(45) Date of Patent: Feb. 11, 2020

(54) DENITRIFICATION BIOFILTER DEVICE AND METHOD FOR TREATING WASTEWATER

(71) Applicant: Nanjing University, Nanjing (CN)

(72) Inventors: Hongqiang Ren, Nanjing (CN); Haidong Hu, Nanjing (CN); Jinju Geng, Nanjing (CN); Ke Xu, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 1205 days.

(21) Appl. No.: 14/470,931

(22) Filed: Aug. 27, 2014

(65) Prior Publication Data

US 2015/0108066 A1    Apr. 23, 2015

(30) Foreign Application Priority Data

Oct. 22, 2013  (CN) .......................... 2013 1 0497488

(51) Int. Cl.
*C02F 3/04* (2006.01)
*C02F 3/28* (2006.01)
*C02F 3/00* (2006.01)
*C02F 101/16* (2006.01)

(52) U.S. Cl.
CPC .......... *C02F 3/2866* (2013.01); *C02F 3/2813* (2013.01); *C02F 2003/001* (2013.01); *C02F 2101/16* (2013.01); *C02F 2305/06* (2013.01)

(58) Field of Classification Search
CPC .......... C02F 3/2866; C02F 3/04; C02F 3/107; C02F 3/2813; C02F 3/302; C02F 2003/001; C02F 2101/16; C02F 2303/16; C02F 2305/06; Y02W 10/15
See application file for complete search history.

(56) References Cited

U.S. PATENT DOCUMENTS

| | | | |
|---|---|---|---|
| 2009/0294356 A1* | 12/2009 | Beggs .................... | B01D 24/14 210/618 |
| 2011/0212007 A1* | 9/2011 | Lu ......................... | B01J 29/7215 423/213.5 |
| 2012/0091045 A1* | 4/2012 | Robertson ............... | C02F 3/006 210/86 |

OTHER PUBLICATIONS

Rosatom, Zeolite Catalysts, 2013 (Year: 2013).*
Analcime, IZA Commissons on Natural Zeolites, Apr. 8, 2009 (Year: 2009).*

* cited by examiner

*Primary Examiner* — Bobby Ramdhanie
*Assistant Examiner* — Donovan Bui-Huynh
(74) *Attorney, Agent, or Firm* — Matthias Scholl P.C.; Matthias Scholl

(57) ABSTRACT

A denitrification biofilter device, including: a regulating pool, a reactor body, a water tank, a first doser, a second doser, a backwash pump, a water inlet pump, and a blower. The regulating pool includes a raw water inlet and a water outlet. The reactor body includes a uniform water distributor, a filler layer, a buffer layer, a filter layer, a supporting layer, a filler supporting plate, a backwash water outlet, a treated water outlet, and a backwash water inlet. The treated water outlet and the backwash water inlet are disposed at the bottom of the reactor body and are connected to the water tank via pipes. The filler layer is filled with zeolites having a grain size of between 4 and 8 mm, a density of between 1.9 and 2.6 $g/cm^3$, a porosity greater or equal to 48%, and a specific surface area of between 570 and 670 $m^2/g$.

6 Claims, 3 Drawing Sheets

DENITRIFICATION BIOFILTER DEVICE AND METHOD FOR TREATING WASTEWATER

CROSS-REFERENCE TO RELATED APPLICATIONS

Pursuant to 35 U.S.C. § 119 and the Paris Convention Treaty, this application claims the benefit of Chinese Patent Application No. 201310497488.9 filed Oct. 22, 2013, the contents of which are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to the field of the wastewater treatment, and more particularly to a denitrification biofilter device and a method for treating wastewater.

Description of the Related Art

Denitrification biofilter is used for deep treatment of nitrogen in wastewater. The principle of the denitrification biofilter is that a biofilm adhering on a filler in a reactor is utilized to reduce nitrite and nitrate into nitrogen, nitric oxide, or nitrous oxide in anoxic condition (in the absence of molecular dissolved oxygen).

It has been found that the existence of oxygen inhibits nitrogen removal effect in the denitrification and increases the nitrite in the effluent. As dissolved oxygen widely exists in a secondary effluent, the dissolved oxygen in an influent results in a large consumption of external carbon source of the denitrification biofilter, thereby increasing the operation costs. Furthermore, the conventional denitrification biofilters have a limited removal rate of ammonia nitrogen in the wastewater, and a total nitrogen concentration in the effluent is always unstable due to the affection of the ammonia nitrogen load in the influent.

A typical denitrification biofilter device for controlling the addition of the carbon source includes a denitrification biofilter. The denitrification biofilter is provided with an online influent nitrate sensor, an online influent dissolved oxygen sensor, an online effluent nitrate sensor, a nitrate analyzer, a dissolved oxygen analyzer, a process controller, an industrial control computer, a carbon source tank, a variable frequency carbon source pump, and a carbon source flowmeter. And a corresponding method for controlling the addition of the carbon source includes: 1) water introduction; 2) parameter treatment and judgment; 3) frequency treatment by a frequency converter; 4) dosing control of the carbon source; 5) stable operation process; 6) failure diagnosis; and 7) backwashing process. The device and the corresponding method are adapted to deep wastewater treatment and nitrogen-containing industrial wastewater treatment.

Another typical device for treating a secondary effluent of urban sewage includes a denitrification biofilter device. The denitrification biofilter device is provided with a carbon source tank, a variable frequency dosing pump for regulating the flow, and a pipe. The regulation of the variable frequency dosing pump is conducted to control the addition of the carbon source according to an online nitrate nitrogen concentration meter and an online chemical oxygen demand (COD) concentration meter.

The above devices and methods are designed on the purpose for controlling the production costs by optimization of the addition of the carbon source, however, the dissolved oxygen of the influent is not decreased, the consumption of the carbon source is large, the production cost is still high, and a large amount of the carbon source is wasted.

SUMMARY OF THE INVENTION

In view of the above-described problems, it is one objective of the invention to provide a denitrification biofilter device and a method for treating wastewater. The device and the method have low energy consumption and are capable of effectively decreasing dissolved oxygen of an influent, decreasing a dose of an external carbon source on the premise of a basically constant total nitrogen concentration of an effluent, thereby being economic and stable.

To achieve the above objective, in accordance with one embodiment of the invention, there is provided a denitrification biofilter device comprising: a regulating pool, a reactor body, a water tank, a first doser, a second doser, a backwash pump, a water inlet pump, and a blower. The regulating pool comprises a raw water inlet and a water outlet. The reactor body comprises: a uniform water distributor, a filler layer, a buffer layer, a filter layer, a supporting layer, a filler supporting plate, a backwash water outlet, a treated water outlet, and a backwash water inlet. The first doser comprises a dosing tube. The dosing tube is extended into the regulating pool. The water outlet of the regulating pool is connected to the water inlet pump and a top of the reactor body via pipes. The reactor body is in a cylinder structure. The uniform water distributor, the filler layer, the buffer layer, the filter layer, and the supporting layer are disposed inside the reactor body from top to bottom. The filler supporting plate is disposed between the filler layer and the buffer layer. The backwash water outlet is disposed on a sidewall of the buffer layer. The treated water outlet and the backwash water inlet are disposed at a bottom of the reactor body and are connected to the water tank via pipes, respectively. The backwash pump is disposed on a pipe between the backwash water inlet and the water tank. The second doser is connected to the sidewall of the buffer layer via a pipe. The filler layer is filled with zeolites, and each zeolite has a grain size of between 4 and 8 mm, a density of between 1.9 and 2.6 g/cm$^3$, a porosity of more than or equal to 48%, and a specific surface area of between 570 and 670 m$^2$/g. The high specific surface area and the high porosity provide a large habitat space to enable a large amount of microbes to adhere and propagate on a surface of the filler.

In a class of this embodiment, the uniform water distributor comprises: a main pipe, branch pipes, and water distributing holes. The water distributing holes having equal diameters are evenly disposed at equal intervals at a lower side of each branch pipe.

In a class of this embodiment, the supporting layer is filled with pebbles, and each pebble has a grain size of between 2 and 6 mm and a density of 2.65 g/cm$^3$.

In a class of this embodiment, the filter layer is filled with sea sand having a grain size of between 2 and 3 mm. The sea sand features in corrosion resistance, round grain shape, high silicon content, strong hardness, relative good filtration efficiency, and long service life.

In a class of this embodiment, a total height of the reactor body is 2.02 m. A thickness of the filler layer is 0.5 m. A thickness of the filler layer is 0.9 m.

In a class of this embodiment, four curved holes are disposed on a periphery of the filler supporting plate contacting with an inner wall of the reactor body. Each of the curved holes has a radian of 1.05 rad and a width of 4 mm. The four curved holes are symmetrically disposed in relative to a center of the filler supporting layer. A majority of gravity flow denitrification biofilters adopt variable water level control, in which, the influent cascade overflows an influent weir. Such water introduction process is prone to carry the air, so that the dissolved oxygen in the influent is increased, the denitrification effect is decreased, and the dose of the carbon source is increased. In view of such adverse factors, a center of the filler supporting plate of the invention is designed in the absence of holes, but four curved holes having the radian of 1.05 rad and the width of 4 mm are disposed on the filler supporting plate contacting with the inner wall of the biofilter, so that the water passes though the curved holes along the inner wall of the biofilter to enter the buffer layer in the form of a laminar flow. The curved holes of such special shape avoid the oxygen in the air from entering the water and decrease the carbon source consumption in subsequent process.

In accordance with another embodiment of the invention, there is provided a method for treating wastewater, the method comprising the following steps:

1) introducing wastewater to be treated into a regulating pool, opening a first doser, and adding an ammonium chloride solution to the regulating pool via the first doser to allow a concentration of ammonia nitrogen to be 1.6±0.3 mg/L;

2) starting a water inlet pump to enable water to pass through a uniform water distributor to enter a filler layer where $NH_4^+$—N in the water is absorbed by zeolites and is converted into nitrate nitrogen and nitrite nitrogen by nitrifying bacteria via nitrification in the presence of dissolved oxygen in the water;

3) allowing the water flowing out of the filler layer to pass through holes arranged at a periphery of a filler supporting plate along a sidewall of a reactor body to enter a buffer layer and then to flow directly into a filter layer, while starting a second doser, and adding sodium acetate to the buffer layer as an external carbon source, so that the external carbon source and an original biochemical oxygen demand (BOD) in the wastewater are used as the organic carbon source for the denitrification bacteria in the filter layer to reduce nitrite and nitrate into nitrogen;

4) introducing the water after being treated by the filter layer to pass through the supporting layer and to enter a water tank; and 5) allowing one part of the water in the water tank to backwash the filter layer when the backwash pump is started, and discharging the remaining water reaching the standard.

In a class of this embodiment, a dose of sodium acetate in step 3) satisfies that a carbon content in sodium acetate/a nitrogen content in an influent is equal to 1.86.

The filler layer is disposed at the top of the reactor body and is able to decrease the influence of the denitrification on the dissolved oxygen of the influent. The raw water passes through the filler layer where $NH_4^+$—N in the raw water is absorbed by the zeolite, and nitrification of nitrifying bacteria adhering on the zeolites occurs in the presence of $NH_4^+$—N and dissolved oxygen in the water. Even when the content of ammonia nitrogen in the influent is low (0.78 mg/L), the dissolved oxygen of the influent can be decreased from 6.70 mg/L to 4.15 mg/L by nitrification. Because the dissolved oxygen content in the raw water is decreased by the nitrification, the carbon source that is required by the denitrification occurring in the filter layer is largely decreased. Thus, the amount of the external carbon source is decreased on the premise of a constant total nitrogen concentration in the effluent, and an external carbon-nitrogen ratio is decreased from C/N=3 to C/N=1.86. The nitrification decreases the inhibition effect of the dissolved oxygen on the denitrification, increases a hydraulic loading to 4 $m^3m^{-2}h^{-1}$, and maintains the total nitrogen concentration in the effluent to be basically constant and less than 3 mg/L. The zeolites has a strong absorption effect on $NH_4^+$—N, so that the total nitrogen removal rate in the denitrification biofilter is still stable even when the secondary effluent from a wastewater treatment plant is unstable and ammonia nitrogen load is increased. The device of the invention features in small occupied area, low operating cost, and stable effluent.

Advantages according to embodiments of the invention are summarized as follows:

1) The filler layer of the invention is able to decrease the influence of the dissolved oxygen of the influent on the denitrification, so that the carbon source that is required by the denitrification occurring in the filter layer is largely decreased, the dose of the external carbon source is decreased on the premise of a constant total nitrogen concentration in the effluent, thereby decreasing the operating cost.

2) The filler supporting plate is designed in the absence of holes on the center while curved holes having equal widths are disposed on the filler supporting plate contacting with the inner wall of the reaction body, so that the water passes through the curved holes along the inner wall of the biofilter and enters the buffer layer in the form of the laminar flow, and no tiny water whirlpool is produced in the falling process of the water flow.

3) Because of the nitrification effect of the filler layer, a good removal effect of ammonia nitrogen of the denitrification biofilter device is realized.

4) The zeolites have strong absorption effect on $NH_4^+$—N. Even the secondary effluent from the sewage treatment plant is unstable, the concentration of ammonia nitrogen of the effluent is still <1 mg/L in condition of an increase of ammonia nitrogen loading of 5 mg/L, so that the effluent stability of the denitrification biofilter is ensured.

5) The original hazardous substance (ammonia nitrogen) in the wastewater is fully utilized to ensure the total nitrogen concentration of the effluent by the biochemical method, thereby being economic and environment-friendly.

BRIEF DESCRIPTION OF THE DRAWINGS

The invention is described hereinbelow with reference to the accompanying drawings, in which.

Figure 1:
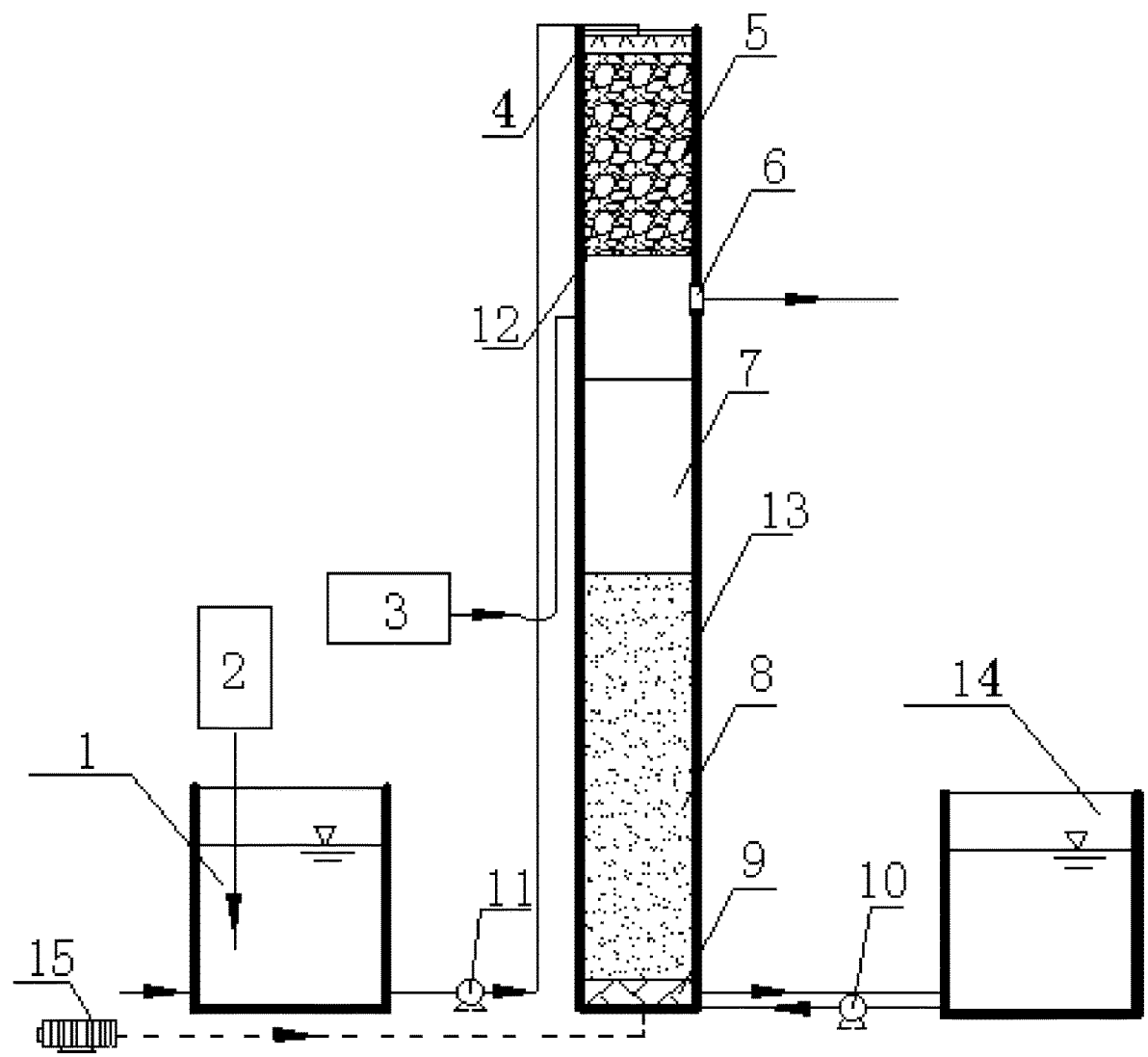
FIG. 1 is a structure diagram of a denitrification biofilter device in accordance with one embodiment of the invention.
Figure 2:
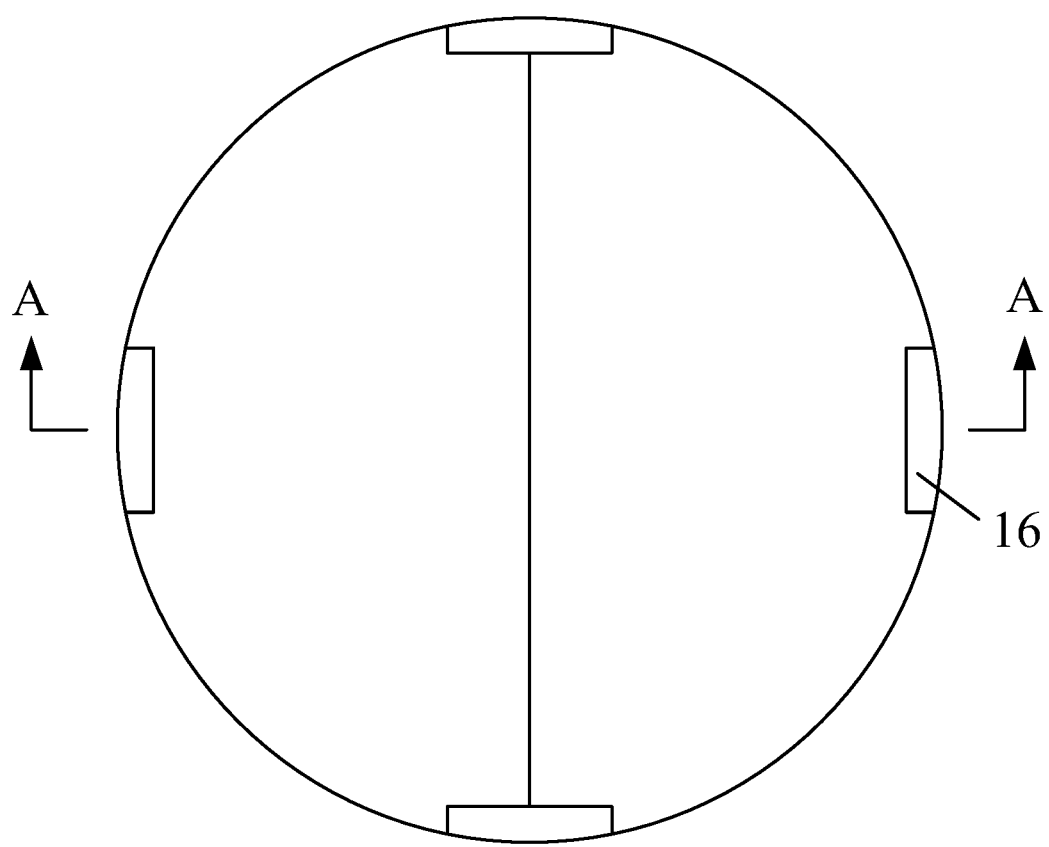
FIG. 2 is a structure diagram of a filler supporting plate in accordance with one embodiment of the invention.
Figure 3:
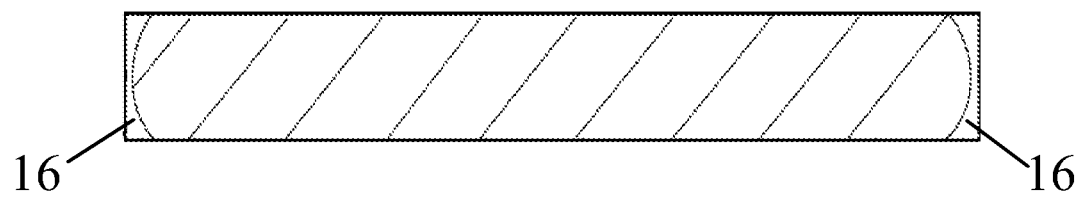
FIG. 3 is a cross-sectional view taken from line A-A of FIG. 2.

As In the drawings, the following numbers are used: 1. Regulating pool; 2. First doser; 3. Second doser; 4. Uniform water distributor; 5. Filler layer; 6. Backwash water outlet; 7. Buffer layer; 8. Filter layer; 9. Supporting layer; 10. Backwash pump; 11. Water inlet pump; 12. Filler supporting plate; 13. Reactor body; 14. Water tank; 15. Blower; and 16. Curved holes.

DETAILED DESCRIPTION OF THE EMBODIMENTS

For further illustrating the invention, experiments detailing a denitrification biofilter device and a method for treating wastewater are described below. It should be noted that the following examples are intended to describe and not to limit the invention.

As shown in FIG. 1, a denitrification biofilter device comprises: a regulating pool 1, a reactor body 13, and a water tank 14, a first doser 2, a second doser 3, a backwash pump 10, a water inlet pump 11, and a blower 15. The first doser 2 is provided with a dosing tube and the dosing tube is extended into the regulating pool 1. The regulating pool 1 comprises a raw water inlet and a water outlet. The water outlet of the regulating pool 1 is connected with the water inlet pump 11 and a top of the reactor body 13 in sequence via pipes. The reactor body 13 is in a cylinder structure. A uniform water distributor 4, a filler layer 5, a buffer layer 7, a filter layer 8, and a supporting layer 9 are disposed from top to bottom inside the reactor body 13. A filler supporting plate 12 is disposed between the filler layer 5 and the buffer layer 7. A backwash water outlet 6 is disposed on a sidewall of the buffer layer 7. A treated water outlet and a backwash water inlet are disposed at a bottom of the reactor body 13, and the treated water outlet and the backwash water inlet are connected to the water tank 14 via pipes. The backwash pump 10 is disposed on a pipe between the backwash water inlet and the water tank 14. The second doser 3 is connected to the sidewall of the buffer layer 7 via a pipe. The filler layer 5 is filled with zeolites, and each zeolite having a grain size of between 4 and 8 mm, a density of between 1.9 and 2.6 g/cm$^3$, a porosity of more than or equal to 48%, and a specific surface area of between 570 and 670 m$^2$/g. The uniform water distributor 4 comprises: a main pipe, branch pipes, and water distributing holes. 15 water distributing holes having equal diameters are evenly distributed at equal intervals on a lower side of each branch pipe. The supporting layer 9 is filled with pebbles, and each pebble has a grain size of between 2 and 6 mm and a density of 2.65 g/cm$^3$. The filter layer 8 is filled with sea sand having a grain size of between 2 and 3 mm. A center of the filler supporting plate 12 is designed in the absence of holes. Four curved holes 16 are disposed on a periphery of the filler supporting plate 12 contacting with the inner wall of the reactor body 13. Each of the curved holes 16 has a radian of 1.05 rad and a width of 4 mm. A distance between a center position of each curved hole 16 and an inner wall of the reactor body 13 is 0.5 mm, and the four curved holes 16 are uniformly distributed in relative to the center of the filler supporting plate 12. Such shape design enables the downwardly flowing wastewater to pass through the curved holes in the form of a laminar flow along the inner wall of the reactor body 13 to enter the buffer layer, thereby avoiding water whirlpool that occurs in the conventional water flowing holes and preventing the oxygen in the air from entering the water. The denitrification biofilter is constantly fed with water by the water inlet pump. The constant water level operation is capable of decreasing the cascade and avoiding the production of the dissolved oxygen.

A method for treating wastewater is conducted as follows:
1) Wastewater to be treated is introduced into the regulating pool 1. The first doser 2 is opened, and an ammonium chloride solution is added to the regulating pool 1 via the first doser 2 to enable a concentration of ammonia nitrogen to be 1.6±0.3 mg/L. A removal rate of ammonia nitrogen after 22 days treatment exceeds 76% and a concentration of ammonia nitrogen is stable. After that, the first doser 2 is closed. When the concentration of ammonia nitrogen of the influent is 0.78 mg/L, the filler layer 5 is capable of decreasing the dissolved oxygen of the influent from 6.70 mg/L to 4.15 mg/L.

2) The water inlet pump 11 is started, the water passes through the uniform water distributor 4 to enter the filler layer 5 where $NH_4^+$—N of the influent is absorbed by the zeolites, nitrification of the nitrification bacteria occurs using $NH_4^+$—N and the dissolved water, and $NH_4^+$—N is converted into nitrate nitrogen and nitrite nitrogen.

3) The water flowing out of the filler layer 5 passes through curved holes of the filler supporting plate 12 along the sidewall of the reactor body to enter the buffer layer 7 and then to flow directly into the filter layer 8. Meanwhile, the second doser 3 is operated to add sodium acetate to the buffer layer 7 as an external carbon source. The external carbon source and the original BOD in the wastewater serve as the organic carbon source for the denitrification bacteria in the filter layer 8 to reduce nitrite and nitrate into nitrogen. After 12 days treatment, the removal rate of the nitrate nitrogen in the filter layer 8 reaches 84% and is stabilized.

4) The water after being treated by the filter layer 8 passes through the supporting layer 9 and enters the water tank 14.

5) One part of the water in the water tank 14 is used to backwash the filter layer 8 when the backwash pump 10 is opened, the water/gas simultaneously backwash the filter layer 8 for 3 min with a water intensity of 8 L/(s·m$^2$) and a gas intensity of 14 L/(s·m$^2$). The remaining water reaching the standard is discharged.

The filler layer is able to effectively decrease the inhibition effect of the dissolved oxygen on the denitrification, so that the external carbon-nitrogen ratio is decreased from C/N=3 to C/N=1.86 on the premise of a constant total nitrogen concentration.

The device having a hydraulic loading of 2 m$^3$/(m$^2$h) and an external carbon-nitrogen ratio of C/N=1.86 is utilized, and changes in water quality before and after treatment are as follows:

|  | $NH_3$—N (mg/L) | $NO_3$—N (mg/L) | $NO_2$—N (mg/L) | TN (mg/L) | SS (mg/L) | TP (mg/L) | COD (mg/L) |
|---|---|---|---|---|---|---|---|
| Before treatment | 0.78 | 8.50 | 0.0083 | 9.67 | 7.8 | 0.23 | 33.56 |
| After treatment | 0.20 | 1.06 | 0.023 | 1.39 | 1.5 | 0.07 | 28.16 |

When the hydraulic loading is increased to 4 m$^3$/(m$^2$h), the total nitrogen of the effluent is 2.62 mg/L, which still satisfies the total nitrogen of the effluent <3 mg/L.

Because of the strong absorption effect of the zeolite on $NH_4^+$—N, the total nitrogen of the effluent of the denitrification biofilter is still stabilized within 3 mg/L even when the secondary effluent from the sewage is unstable and ammonia nitrogen loading is increased to 5 mg/L.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A device, comprising:
 a) a regulating pool, the regulating pool comprising a first inlet and a first outlet;
 b) a reactor body, the reactor body comprising a uniform water distributor, a filler layer, a buffer layer, a filter layer, a supporting layer, a filler supporting plate, a second outlet, a third outlet, and a second inlet;
 c) a water tank;
 d) a first doser, the first doser comprising a dosing tube;
 e) a second doser;
 f) a backwash pump;
 g) a water inlet pump; and
 h) a blower;
wherein
 the dosing tube is extended into the regulating pool;
 the first outlet of the regulating pool is connected to the water inlet pump and a top of the reactor body via pipes;
 the reactor body is in a cylinder structure;
 the uniform water distributor, the filler layer, the filler supporting plate, the buffer layer, the filter layer, and the supporting layer are disposed inside the reactor body from top to bottom in that order;
 the filler layer is disposed in an upper portion of the reactor body;
 the buffer layer is disposed in a middle portion of the reactor body;
 the filter layer is disposed in a lower portion of the reactor body;
 the filler layer comprises nitrifying bacteria;
 the filter layer comprises denitrifying bacteria;
 the filler supporting plate is disposed between the filler layer and the buffer layer;
 a plurality of curved holes is disposed at a periphery of the filler supporting plate;
 the second outlet is disposed on a sidewall of the buffer layer;
 the third outlet and the second inlet are disposed at a bottom of the reactor body and are connected to the water tank via pipes, respectively;
 the backwash pump is disposed on a pipe between the second inlet and the water tank;
 the second doser is connected to the sidewall of the buffer layer via a pipe;
 the filler layer is filled with zeolites having a grain size of between 4 and 8 mm, a density of between 1.9 and 2.6 g/cm$^3$, a porosity of more than or equal to 48%, and a specific surface area of between 570 and 670 m$^2$/g; and
when in use,
 wastewater comprising ammonium is introduced into the filler layer, and ammonium is converted to nitrate and nitrite by the nitrifying bacteria via a nitrification process;
 the wastewater from the filler layer flows into the buffer layer and then to the filter layer; and
 a source of carbon is added into the buffer layer via the second doser and is then consumed by the denitrifying bacteria in the filter layer,
and nitrate and nitrite are reduced into nitrogen by the denitrifying bacteria via a denitrification process.

2. The device of claim 1, wherein
 the uniform water distributor comprises: a main pipe, branch pipes, and water distributing holes; and
 the water distributing holes having equal diameters are evenly disposed at equal intervals at a lower side of each branch pipe.

3. The device of claim 1, wherein the supporting layer is filled with pebbles, each pebble has a grain size of between 2 and 6 mm and a density of 2.65 g/cm$^3$.

4. The device of claim 1, wherein the filter layer is filled with sea sand having a grain size of between 2 and 3 mm.

5. The device of claim 1, wherein four curved holes are disposed on a periphery of the filler supporting plate contacting with an inner wall of the reactor body; and each of the curved holes has a radian of 1.05 rad and a width of 4 mm.

6. The device of claim 1, wherein the source of carbon comprises sodium acetate.

\* \* \* \* \*